(12) United States Patent
Spindler et al.

(10) Patent No.: US 6,583,999 B1
(45) Date of Patent: Jun. 24, 2003

(54) LOW OUTPUT VOLTAGE, HIGH CURRENT, HALF-BRIDGE, SERIES-RESONANT, MULTIPHASE, DC-DC POWER SUPPLY

(75) Inventors: Leonid Spindler, Lod (IL); Valery Gabdoulin, Petach Tiqua (IL)

(73) Assignee: Appletec Ltd., Tsur Yigal (IL)

( * ) Notice: Subject to any disclaimer, the term of this patent is extended or adjusted under 35 U.S.C. 154(b) by 0 days.

(21) Appl. No.: 10/054,885

(22) Filed: Jan. 25, 2002

(51) Int. Cl.$^7$ ................... H02M 3/24; H02M 7/5387
(52) U.S. Cl. ..................... 363/98; 363/17; 363/132
(58) Field of Search .................. 363/16, 17, 97, 363/98, 131, 132

(56) References Cited

U.S. PATENT DOCUMENTS

| | | | |
|---|---|---|---|
| 4,533,986 A | | 8/1985 | Jones |
| 5,925,990 A | * | 7/1999 | Crouse et al. ............ 315/127 |
| 5,998,930 A | * | 12/1999 | Upadhyay et al. ......... 315/106 |
| 6,023,132 A | * | 2/2000 | Crouse et al. ............ 315/307 |

* cited by examiner

Primary Examiner—Matthew Nguyen
(74) Attorney, Agent, or Firm—Mark M. Friedman

(57) ABSTRACT

A high efficiency, low voltage, high current, half-bridge, series resonant, multiphase, DC-DC power supply includes a combination of a boost type pre-regulator and a "base-sub" half-bridge, series resonant converter unit. The base-sub converter unit includes two half-bridge converters, connected in parallel to the boost type pre-regulator, and having outputs that are combined to produce the required output power. The DC-DC power supply has inherently a Zero Voltage and a Zero Current switching mode feature. The output voltage is the sum of the input voltage and of an additional ("Delta") voltage, whose amplitude varies in order to insure that the output voltage is fixed and stable. In operation, the boost type pre-regulator converts only the additional "Delta" voltage, leading to a significant increase in efficiency of the boost type pre-regulator, and of the entire power supply. The output currents of the two half-bridge resonant converters are phase-shifted by 90°, resulting in very low RMS currents in both the input and output of the power supply, and greatly decreasing I$^2$R losses. The "base-sub" half-bridge, series resonant converter unit operates in both Zero Voltage and Zero Current switch mode, eliminating switching losses.

9 Claims, 6 Drawing Sheets

I out1

I out2

I out1+I out2

LOW OUTPUT VOLTAGE, HIGH CURRENT, HALF-BRIDGE, SERIES-RESONANT, MULTIPHASE, DC-DC POWER SUPPLY

FIELD AND BACKGROUND OF THE INVENTION

DC to DC converters of the resonant type often require the use of parallel-connected power switches to provide adequate current levels, and they require large input and output filters. In addition, parallel operation of switching devices has the problem of current sharing, and large filters are disadvantageous from a size and weight standpoint. A typical prior art converter is shown in FIG. 1, and discussed later.

The output voltage of any DC-DC converter can be regulated by varying either: a) the switching frequency of the converter with respect to the resonant frequency at a constant pulse width, b) the pulse width of the converter at a constant switching frequency in the so-called Pulse Width Modulation (PWM) method, or c) the voltage of a voltage-fed pre-regulator in order to stabilize the output voltage of the power supply.

Each of these methods has its disadvantages:

a) Varying the switching frequency of the converter with respect to the resonance frequency does not allow operation in Zero Voltage Switch (ZVS) and Zero Current Switch (ZCS) mode over the entire range of the frequency operation, thus decreasing efficiency and increasing noise and electromagnetic interference (EMI).

b) The PWM method suffers from turn-on and turn-off losses, and requires use of lossy snubbers across the switches. The turn-on and turn-off losses increase as the operating frequency of the converter is increased.

c) The topology that employs a voltage-fed pre-regulator receives an input voltage and produces a constant output voltage signal across output nodes "A" and "B" (FIG. 1), even if the input voltage to the power supply exhibits substantial voltage transients. This is why a configuration whereby feedback from the output that varies the input voltage and output load, in order to regulate the output voltage, is a preferable circuit configuration. However, this topology includes two separate, series connected stages: a boost converter and a series resonance converter. As a result, the overall efficiency decreases, since the overall efficiency is a multiplication of two efficiencies, that of the boost converter and that of the series half-bridge converter.

Various attempts have been made to address the disadvantages of existing converters (power supplies) by providing a constant frequency, multiphase, full-resonant mode DC to DC converter, suitable for use in low voltage, high current DC power distribution systems. For example, U.S. Pat. No. 4,533,986 to Jones discloses a compact electrical power supply, shown in FIG. 1. Jones's converter includes a serial sequence of a DC to DC boost converter 4, followed by a capacitive energy storage bank 6, and a half-bridge series resonant converter 8. Half-bridge converter 8 includes a transformer 10, an output rectifier and filter 12, a load 14, and a feedback module 15. Boost converter 4 increases the voltage available from a DC source (typically while presenting an inductive load thereto). Boost converter 4 includes an inductor $L_{boost}$ connected to one input terminal of converter 4, and a solid state switch $Q_{boost}$ that is serially connected with $L_{boost}$ between the input terminals of converter 4. A series switching diode $D_{boost}$ is connected between $L_{boost}$ and capacitive energy storage bank 6, which includes three capacitors $C_S$ connected in parallel to the output of the boost converter.

Conduction of $Q_{boost}$ causes current to flow in inductor $L_{boost}$ and electrical energy to be stored in the inductor's magnetic field and in switching diode $D_{boost}$. When $Q_{boost}$ is not conducting, $D_{boost}$ is forward biased in the direction to allow the energy stored in inductor $L_{boost}$ to be transferred in the form of an induced current to the boost converter output.

The capacitive energy in energy storage bank 6 is transferred to half-bridge series resonant converter 8. Half-bridge series resonant converter 8 is constructed from two solid state switches Q1 and Q2 that are serially connected to each other across capacitive energy storage bank 6, and an output transformer 10 having it's primary winding T1 connected to the common output of switches Q1, Q2. Half-bridge series resonant converter 8 supplies the energy received from capacitive energy storage bank 6 to load 14 through output rectifier and filter 12. Half-bridge series resonant converter 8 is operated by controlling the gates of Q1 and Q2, through feedback module 15, causing alternate conduction of either Q1 or Q2 through primary winding T1 to a common terminal A of a series resonant circuit comprising two resonant elements $L_r$ and $C_r$. This produces a pulse input to primary winding T1 of transformer 10, and causes energy to be supplied via a secondary winding T2 of transformer 10, and via output rectifier and filter 12 to load 14. The boost circuit parameters are selected to produce a continuous current flow in the $L_{boost}$ inductor under normal load conditions.

The switching rates of solid state switches Q1 and Q2 always exceed the limits of human audibility, and are consistent with tolerable switching losses in the $Q_{boost}$ solid state switch, and with a minimum size for inductor $L_{boost}$, while achieving a significant voltage boost for increased energy storage in capacitive energy storage bank 6.

Regulating means in the form of a line regulator 30 are provided in boost converter 4, responsive to the voltage stored in $C_S$, for adjusting the duty cycle of $Q_{boost}$ to insure the average stored voltage remains constant. Regulation of the output voltage occurs by adjusting the output voltage of the boost converter, or by adjusting the switching rate of Q1 and Q2 in relation to the resonant frequency of the series resonant elements $L_r$ and $C_r$.

The disadvantages of the DC-DC converter disclosed by Jones, and of all substantially similar converters or power supplies include: a) boost converter 4 affects the entire input voltage, causing insufficient efficiency, especially on low input voltage conditions; b) series half-bridge resonant converter 8 has high RMS currents at both input and output, causing I²R losses and requiring the usage of large filter capacitors, in both input and output; c) resonant converter 8 has large switching losses because of the apparent absence of Zero Voltage and Zero Current switching, thus reducing the overall efficiency; and, d) the apparent absence of Zero Voltage and Zero Current switching results in a great deal of noise and EMI, requiring the addition of large filter elements in order to meet accepted standards.

There is thus a widely recognized need for, and it would be highly advantageous to have, a constant-frequency, multiphase, full-resonant mode, DC to DC converter (power supply), suitable for use in low voltage, high current DC power distribution systems, that does not suffer from the disadvantages of prior art systems listed above.

SUMMARY OF THE INVENTION

The present invention is of a novel, high efficiency DC-DC power supply, and of a method to operate it to increase its efficiency. Specifically, the present invention is of a low voltage, high current, half-bridge, series-resonant, multiphase, DC-DC power supply. The present invention discloses a series-resonant switching DC-DC power supply that includes a combination of a boost type pre-regulator (hereafter simply "pre-regulator") and a "base-sub" half-bridge series-resonant converter unit (hereafter "base-sub converter unit"). The base-sub converter unit includes two (a "base" and a "sub") serial half-bridge converters, connected in parallel to the pre-regulator, and having outputs that are combined to produce the required output power. This unique topology differentiates the base-sub converter unit of the present invention from prior art series-resonant converters. The power supply has inherently a Zero Voltage and a Zero Current switching feature. The power supply of the present invention provides improved ability for high current and low voltage operation, without the necessity of operating in parallel mode, so that the problem of current sharing is avoided. The pre-regulator output voltage is the sum of two voltages: an input voltage input to the pre-regulator, typically varying between 36–75V, and an additional ("Delta") voltage, whose amplitude varies (is adaptive) in response to the input voltage, in order to insure that the pre-regulator output voltage is fixed and stable. In other words, the pre-regulator performs an "adaptive conversion" on the input voltage in a way that provides a Delta voltage that complements the input voltage to obtain the required (and substantially constant) pre-regulator output voltage. For example, if the input voltage is 36V, and the required pre-regulator output voltage is 80V, the "Delta" is 44V. If the input voltage is 75V, for the same 80V pre-regulator output voltage the "Delta" is 5V. This adaptive use of the pre-regulator is the main reason for obtaining a significant increase in its efficiency, as well as in that of the entire power supply. The output of the pre-regulator feeds the input of the base-sub converter unit. The output current of the base converter has a 90° output current phase shift relative to the output current of the sub converter. The 90° phase shift between the two currents results in very low RMS currents in both the input and output of the power supply, and this greatly decreases I²R losses. In addition, because the base and sub converters are operating both in Zero Voltage and Zero Current switch mode, there are no switching losses. The innovative result here is that because the efficiency of each of the power supply sections (the boost type pre-regulator and the base-sub converter unit) is very high, the overall efficiency is also very high, typically about 91% overall. For example, the measured efficiency of the boost pre-regulator is around 98%, and that of the base-sub converter unit is 93%, thus the 91% overall efficiency.

According to the present invention there is provided a power supply comprising: a boost type pre-regulator having a pre-regulator input voltage and a pre-regulator output voltage and configured to perform an adaptive conversion on the pre-regulator input voltage, a base-sub converter unit that includes a base converter and a sub converter, the unit connected to the pre-regulator through a parallel connection of each of the base and sub converters, the base-sub converter unit receiving as input the pre-regulator output voltage and configured to provide a phase shifted combined output, and control means for controlling the pre-regulator and the base-sub converter unit, whereby the adaptive conversion by the pre-regulator, combined with the phase shifted combined output of the base-sub converter unit, provide a highly efficient power conversion by the power supply.

According to the present invention there is provided, in a power supply, a method for obtaining a low ripple, low loss output comprising: providing a boost type pre-regulator having a pre-regulator input voltage and configured to perform an adaptive conversion on the pre-regulator input voltage, a base-sub half-bridge series resonant converter unit that includes a base converter and a sub converter, the base-sub converter unit connected to the pre-regulator through a parallel connection of each of the base and sub converters, performing the adaptive conversion on the pre-regulator input voltage, the adaptive conversion outputting a stable and substantially constant pre-regulator output voltage to the base-sub converter unit, and obtaining a phase shifted combined output from the base-sub converter unit, the phase shifted output characterized by a low ripple, whereby the combined action of the pre-regulator and the base-sub converter unit results in a low power loss, low switching loss, high efficiency power conversion in the power supply.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a novel, high efficiency DC-DC power supply, and of a method to operate in to increase its efficiency. Specifically, the present invention is of a low voltage, high current, half-bridge, series resonant, multiphase, DC-DC power supply. The principles and operation of a DC-DC power supply according to the present invention may be better understood with reference to the drawings and the accompanying description.

Figure 1:
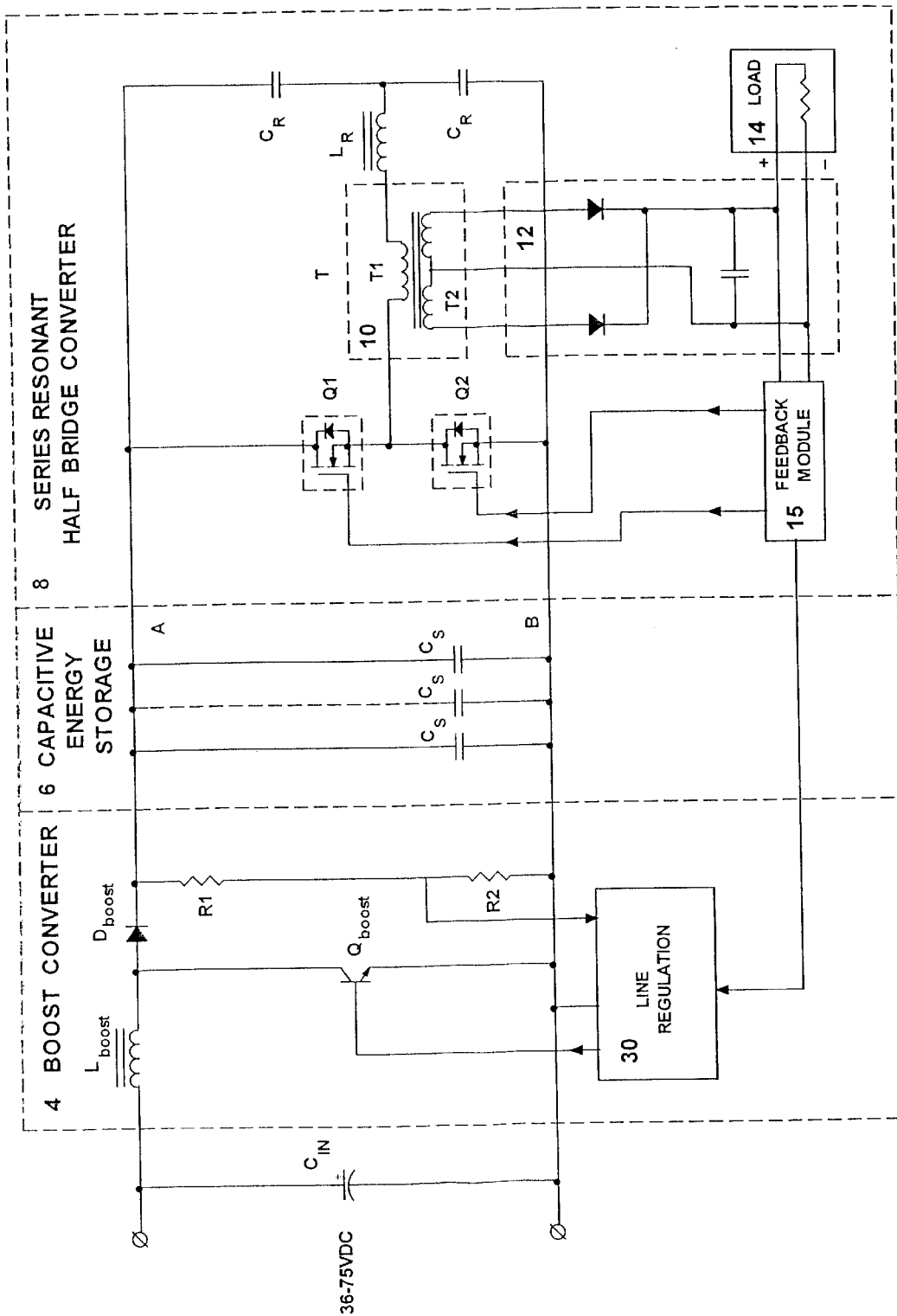
FIG. 1 is a schematic description of a typical prior art DC-DC converter.
Figure 2:
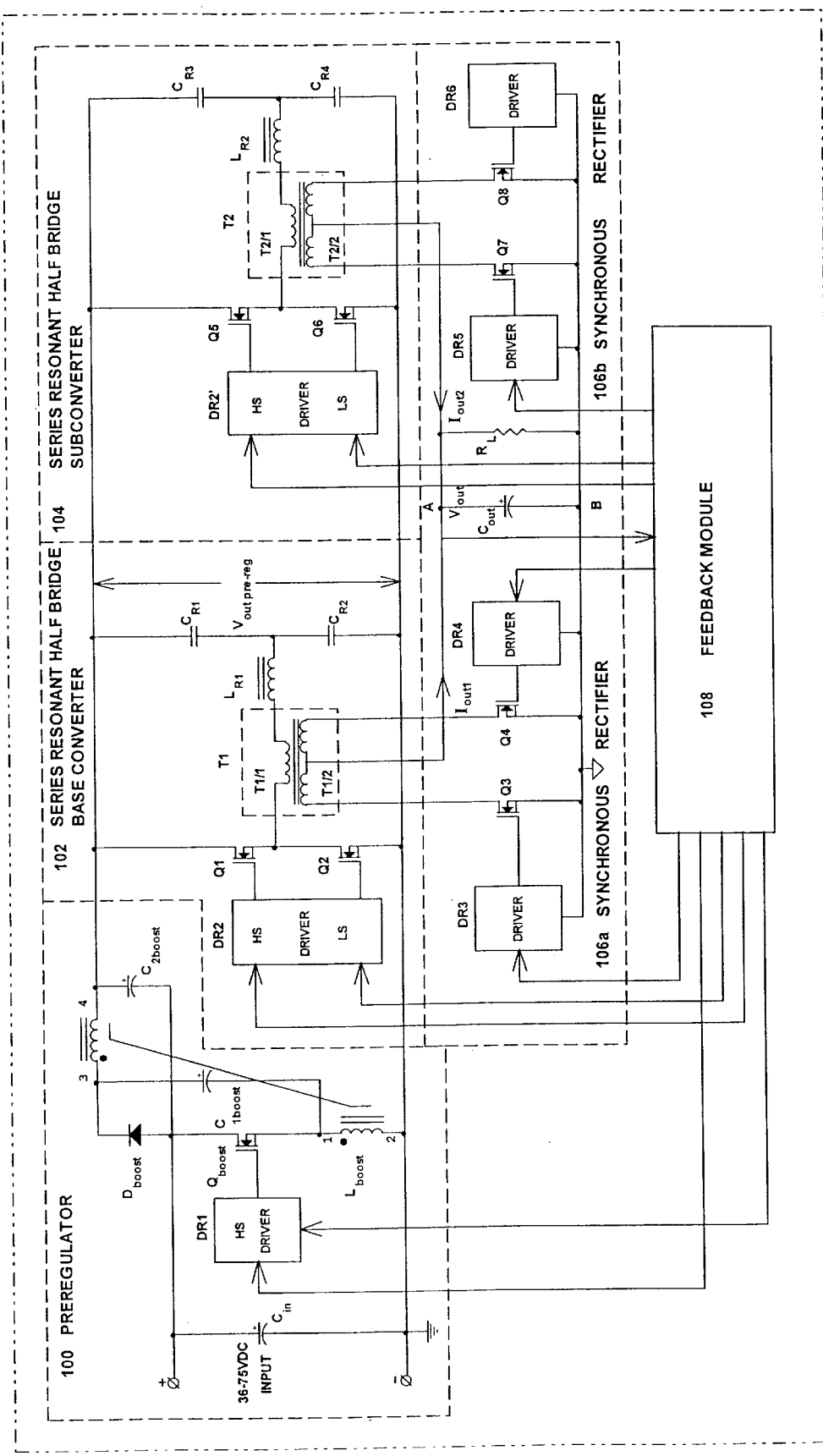
FIG. 2 is a schematic description of one embodiment of a power DC-DC power supply according to the present invention.

Returning now to the figures, FIG. 2 illustrates a preferred embodiment of the DC-DC power supply of the present invention. The power supply derives its power from a DC source that normally supplies between 36 and 75V. A power supply 50 includes a number of blocks: a boost type pre-regulator 100, a series resonant base half-bridge resonant converter ("base converter") 102, a series resonant sub half-bridge resonant converter ("sub converter") 104, two synchronous rectifiers: 106a of base converter 102, and 106b of sub converter 104, and a feedback module 108, each block described and discussed separately below. As mentioned above, base converter 102 and sub converter 104 together form a base-sub converter unit 105.

Boost type pre-regulator 100

Figure 3:
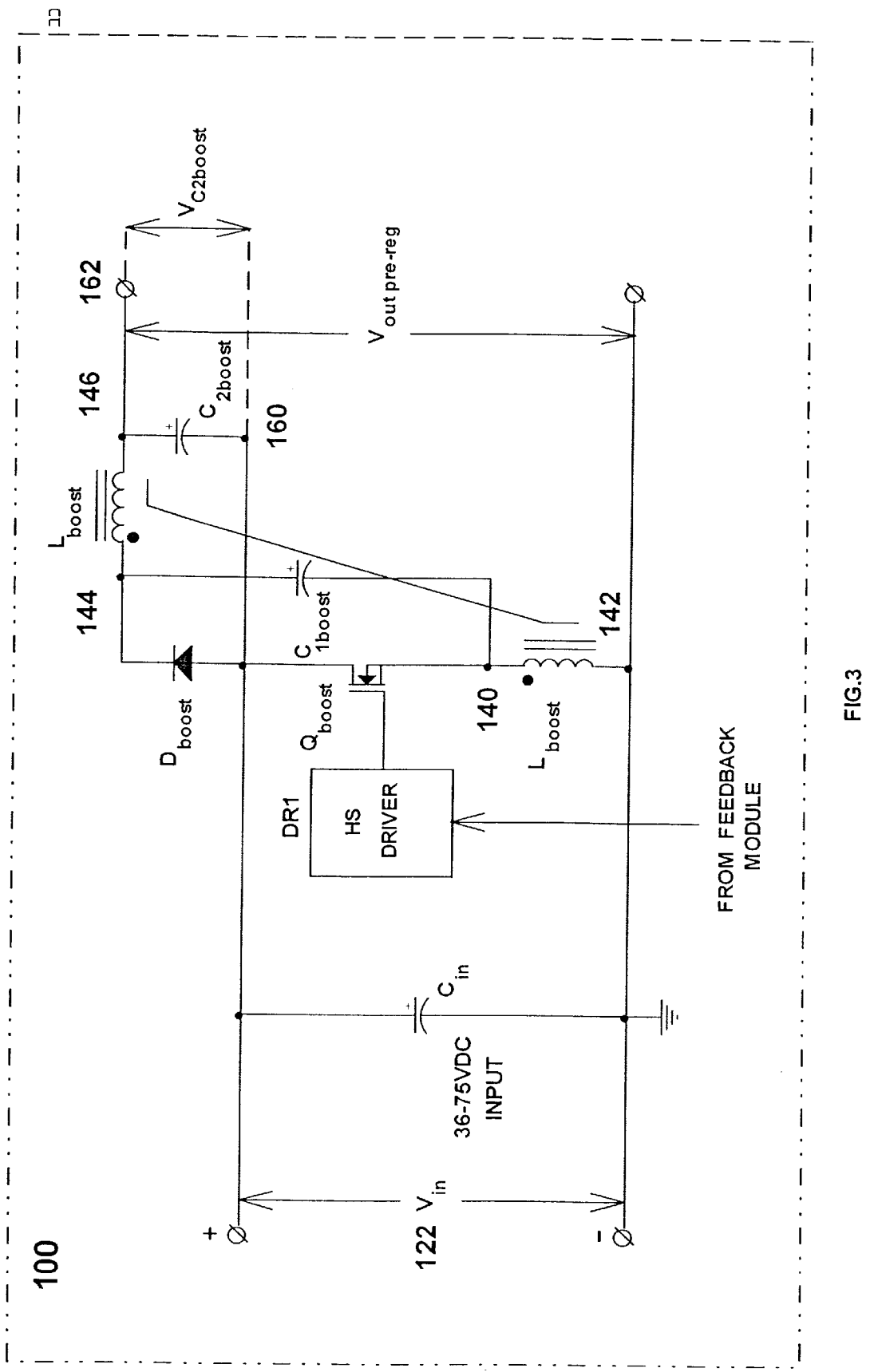
FIG. 3 illustrates schematically a boost type pre-regulator implemented in the power DC-DC power supply of FIG. 2.

FIG. 3 illustrates in detail pre-regulator 100. Pre-regulator 100 is a boost type pre-regulator having a dc input voltage $V_{in}$ 122 coupled to an output $V_{out}$ pre-regulator. Boost type pre-regulator 100 boosts the input voltage from 36–75V to a higher dc value (for example 80V) of a pre-regulator output voltage $V_{out\ pre-reg}$. Pre-regulator 100 includes a coupled inductor $L_{boost}$, a solid state switch $Q_{boost}$, a commutating diode $D_{boost}$ and two capacitive energy sources (capacitors) $C_{1boost}$ and $C_{2boost}$. Inductor $L_{boost}$ has four terminals 140, 142, 144, and 146. Terminal 140 is connected to $Q_{boost}$, terminal 142 is connected to the minus side of input voltage $V_{in}$, terminal 144 is connected to the cathode of $D_{boost}$, and terminal 146 is connected to the output of the pre-regulator. $Q_{boost}$ has its drain connected to the positive side of the input voltage $V_{in}$, and its source connected to terminal 140 of inductor $L_{boost}$. The gate of $Q_{boost}$ is connected through a high side (HS) of a driver DR1 to feedback module 108. $C_{2boost}$ is connected between a positive side 160 of the input voltage and a positive side 162 of the pre-regulator output voltage. Depending on the conduction time of the solid state switch $Q_{boost}$ energy is either being stored in inductor $L_{boost}$ by conduction on the part of $Q_{boost}$, or is being discharged from $L_{boost}$ by conduction of commutating diode $D_{boost}$ to charge capacitive energy source $C_{1boost}$.

Voltage $V_{out\ pre-reg}$ is the sum of two voltages: the input voltage $V_{in}$, and a "Delta" voltage $V_{c2boost}$ on capacitor $C_{2boost}$ that is a fraction of output voltage $V_{out\ pre-reg}$. $V_{c2boost}$ changes in accordance with $V_{in}$. In the example above, $V_{out\ pre-reg}$ must remain unchanged and equal to 80Vdc. In operation, the pre-regulator is fed information from feedback module 108 through driver DR1 regarding the required power supply output voltage, and consequently $V_{out\ pre-reg}$. The required $V_{out\ pre-reg}$ is then obtained by the adaptive conversion on $V_{in}$, which has the purpose of determining, and then obtaining the necessary Delta voltage $V_{c2boost}$, which, as stated above, is a fraction of $V_{out\ pre-reg}$. This constitutes an innovative use of this boost type pre-regulator, the innovation being in the "adaptive conversion" that provides only a fraction of the output voltage which is then added to the input voltage to get a fixed total $V_{out\ pre-reg}$. In contrast, previous uses or applications of such pre-regulators always perform a "direct" conversion, in which $V_{in}$ is converted in-toto to $V_{out\ pre-reg}$. This novel method of use of the pre-regulator allows a huge increase in its efficiency (to about an experimentally determined 98%) as compared to about 92–95% for prior art boost converters.

Base converter 102 and Sub converter 104

Figure 4A:
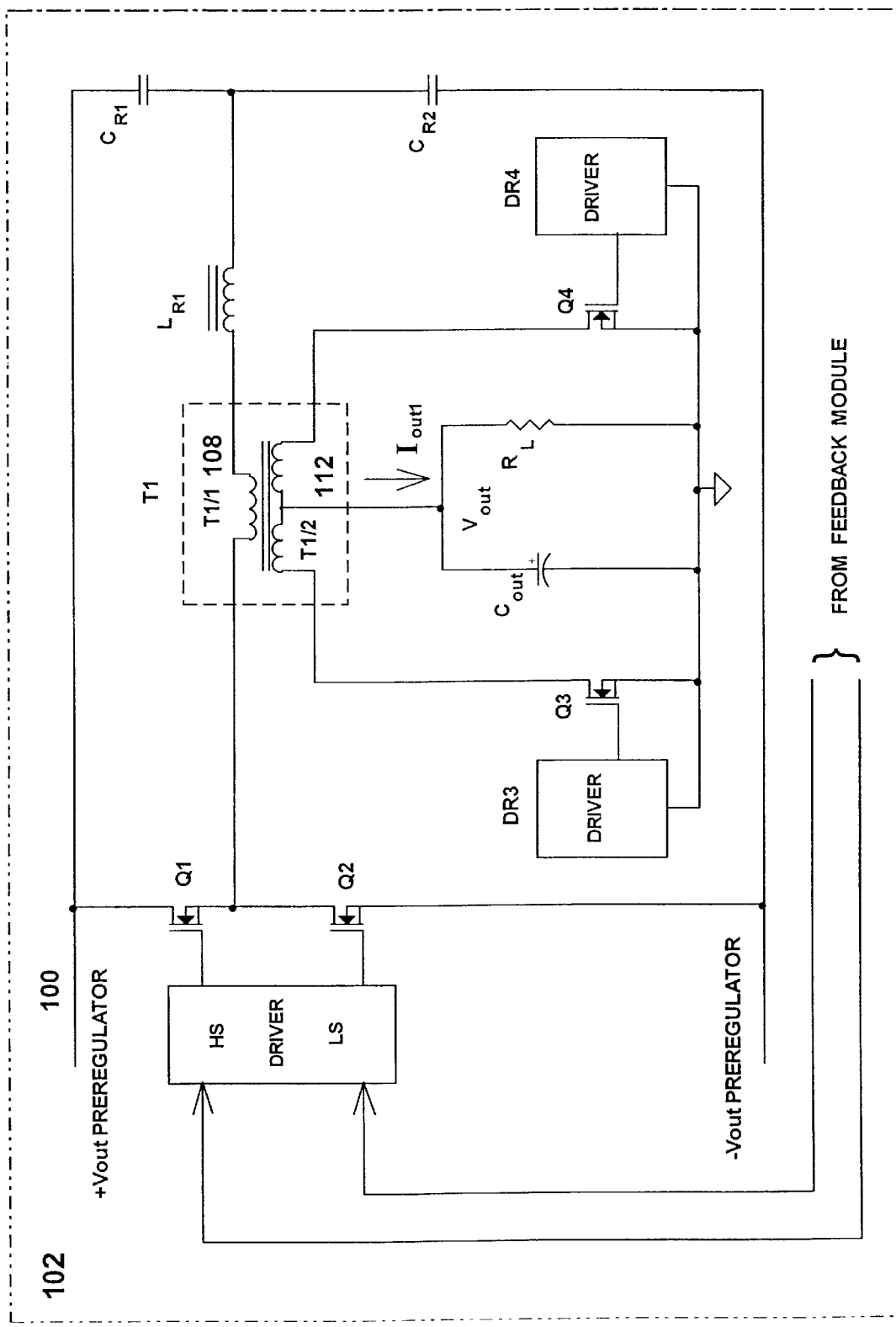
FIG. 4a illustrates schematically a half-bridge base series resonant converter implemented in the power DC-DC power supply of FIG. 2.
Figure 4B:
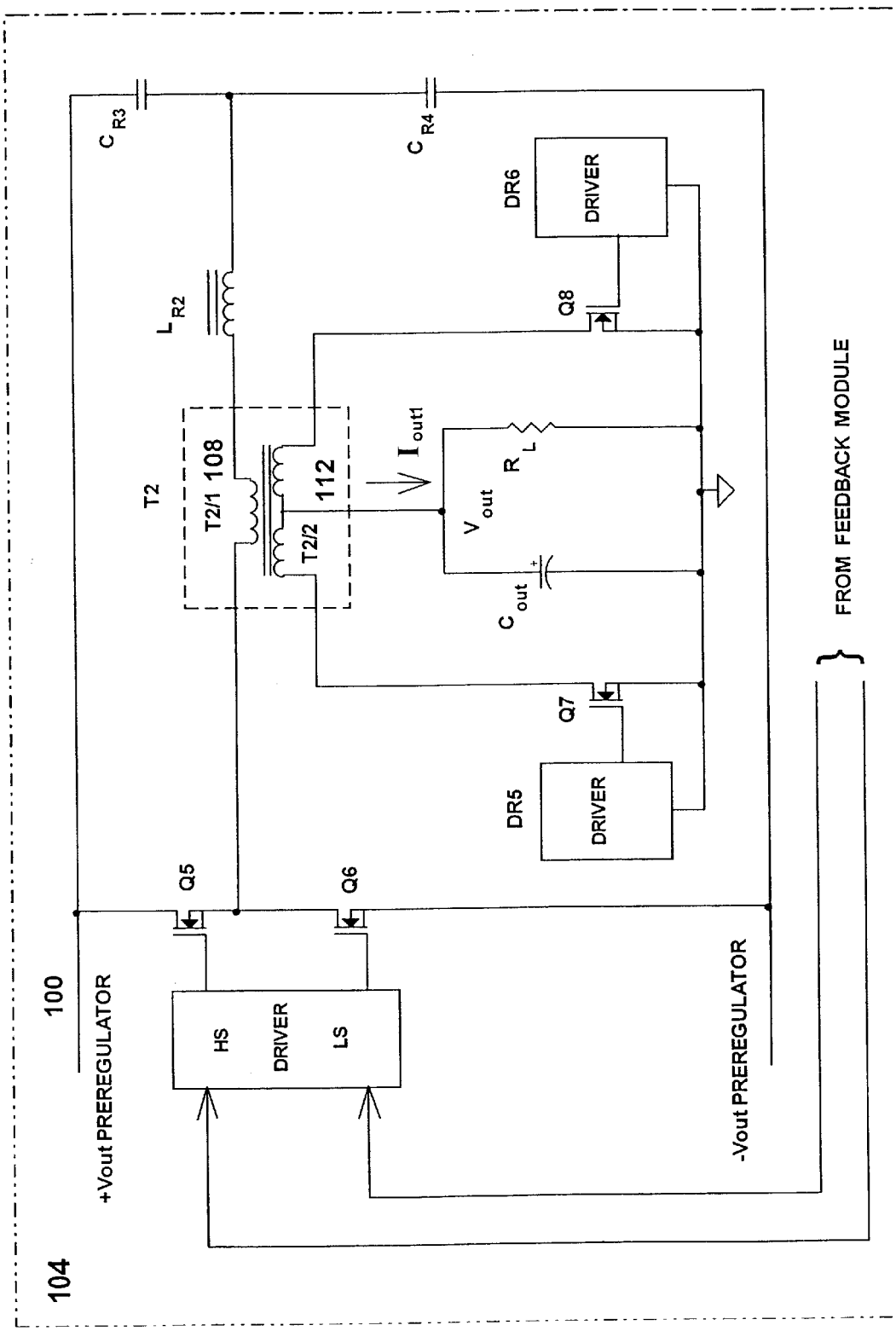
FIG. 4b illustrates schematically a half-bridge sub series resonant converter implemented in the power DC-DC power supply of FIG. 2.

Base and sub series resonant converters 102 and 104 are illustrated in detail in FIGS. 4a and FIG. 4b respectively. A primary section of power supply 50 includes first and second power switches Q1, Q2 of base converter 102, and third and fourth power switches Q5 and Q6 of sub converter 104 that are rendered alternatively conductive to connect to voltage $V_{out\ pre-reg}$. Converters 102 and 104 also include each a series resonant circuit made from two resonant capacitors $CR_1$ and $CR_2$ (for the base converter) and $CR_3$ and $CR_4$ (for the sub converter), a resonant inductor $L_{R1}$ (for the base converter) and $L_{R2}$ (for the sub converter) and a primary winding $T_{1/1}$ of a transformer T1 (for the base converter) and a primary winding $T_{2/1}$ of a transformer T2 (for the sub converter). Converters 102 and 104 further include a secondary winding $T_{1/2}$ of transformer T1, which is connected to two solid state switches Q3 and Q4 of synchronous rectifier 106a, and a secondary winding $T_{2/2}$ of transformer T2 which is connected to two solid state switches Q7 and Q8 of synchronous rectifier 106b and to an output filter capacitor $C_{out}$ and a load represented by a resistor $R_L$. Solid state switches Q1, Q2, Q5, and Q6 in both resonant half-bridge converters are operated by solid state switch controls or drivers DR2 and DR2' for converters 102 and 104 respectively, in order to obtain a phase displacement or shift between output currents $I_{out1}$ and $I_{out2}$ developed by the base (FIG. 4a) and sub (FIG. 4b) converters respectively. Preferably, the shift is of $\pi/2$ electrical degrees. There are many ways known in the art to obtain such a $\pi/2$ shift between two currents.

Synchronous Rectifiers 106a and 106b

Synchronous rectifier 106a includes two drivers DR3 and DR4. Switches Q3 and Q4 are connected in a full wave rectifier bridge configuration through the drivers, and are operated in alternative fashion at a frequency near the resonant frequency of the series resonant circuit. The sinusoidal current developed in primary winding $T_{1/1}$ of transformer T1 is induced in secondary winding $T_{1/2}$ of transformer T1. This current is converted into a DC output voltage $V_{out}$ by the full wave rectifier. The outputs of the base and sub converters are connected together in parallel with one another and with a filter capacitor $C_{OUT}$ and a load $R_L$, by summing means including two nodes "A" and "B" (FIG. 2).

Figure 5:
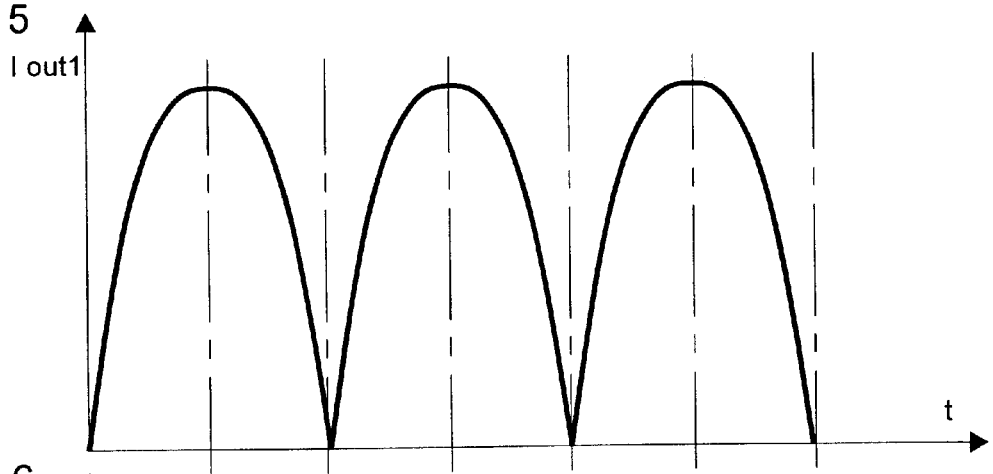
FIG. 5 shows the output current of the base half-bridge series resonance converter $I_{out1}$.
Figure 6:
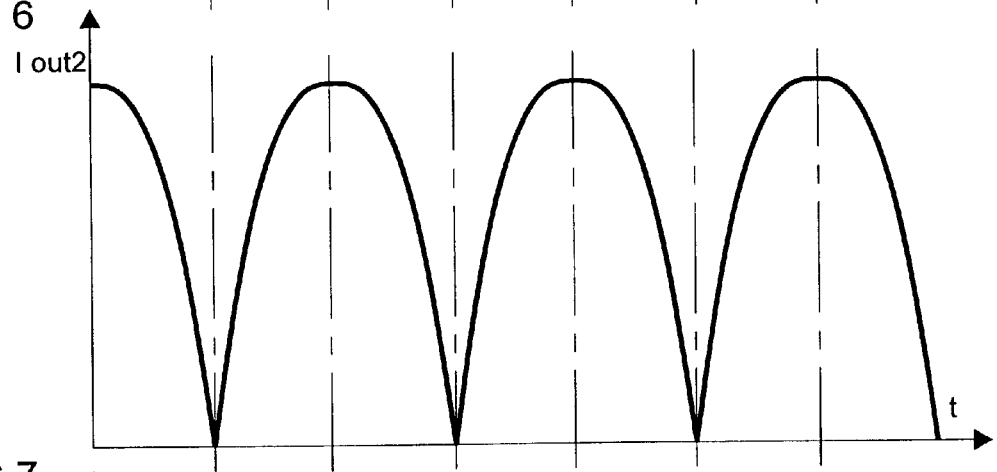
FIG. 6 shows the output current of the sub half-bridge series resonance converter $I_{out2}$.
Figure 7:
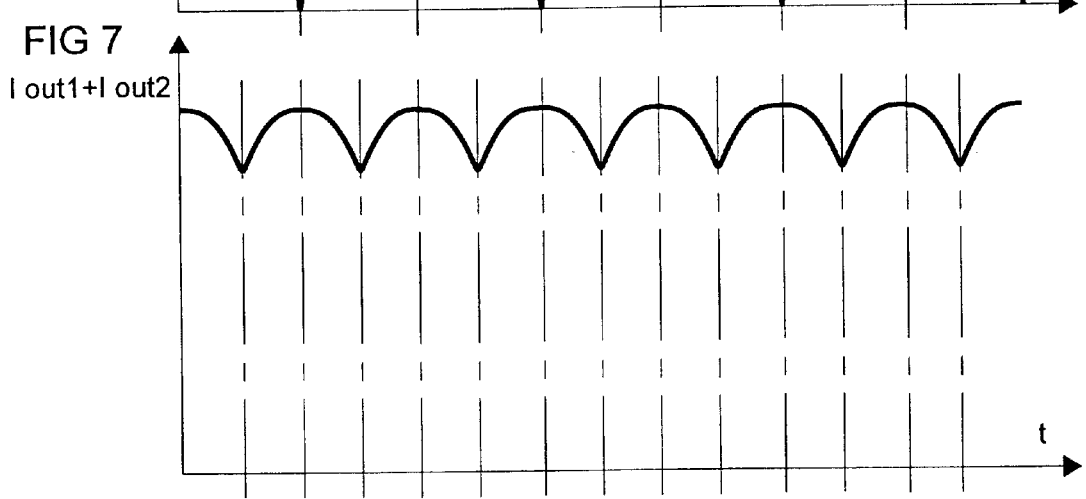
FIG. 7 shows the sum of the output currents $I_{out1}$ and $I_{out2}$.

Output current $I_{out1}$ from base converter 102 is illustrated in FIG. 5. Output current $I_{out2}$ from sub converter 104 is illustrated in FIG. 6. These two output currents are summed to develop a phase shifted combined output current $I_{out1}+I_{out2}$ shown in FIG. 7. The combined current has a frequency equal to double the frequency of a single converter (i.e. each of the frequencies of the base and sub converters). The ripple component of the voltage in combined output current $I_{out1}+I_{out2}$ is smoothed by output filter capacitor $C_{out}$ which is common to both synchronous rectifiers. The resulting smoothed ripple component is very small in amplitude in comparison with the ripple component of prior converters, due to the increased frequency. This is an important advantage of the topology of the power supply of the present invention, and of the method of its use.

The two biggest single advantages in the topology of the power supply of the present invention is the decrease in $I^2R$ losses, and the decrease in switching losses resulting in much greater efficiency. Another significant benefit resulting from the reduction in the amplitude of the input and output ripples is that the size of the input filter is decreased. Additional advantages accrue from the fact that the solid state switches in each of the base and sub converters handle smaller currents for a given output DC level, as compared with solid state switches in prior art converters that provide the same currents. Furthermore, the size and weight of each of the transformers are reduced.

In summary, the DC-DC power supply of the present invention shows significant improvement in three main aspects of operation:

1) The boost type pre-regulator conversion is adaptive, operating on $V_{in}$ to provide a complementary Delta voltage $V_{C2boost}$, which, added to (the varying) $V_{in}$, results in a required, constant $V_{out\ pre-reg}$.
2) The RMS current in the input and output is low compared to the prior art, because the half-bridge series resonant base and sub converters have 90 degrees phase shift between output currents.
3) The base and sub converters inherently operate both in Zero Voltage switch and Zero Current switch modes.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A power supply comprising:
    a. a boost type pre-regulator having a pre-regulator input voltage and a pre-regulator output voltage and configured to perform an adaptive conversion on said pre-regulator input voltage,
    b. a base-sub half-bridge series resonant converter unit that includes a base converter and a sub converter, said unit connected to said boost type pre-regulator through a parallel connection of each of said base and sub converters, said base-sub converter unit receiving as input said pre-regulator output voltage, and configured to provide a phase shifted combined output, and
    c. control means for controlling said pre-regulator and said base-sub half-bridge series resonant converter unit, whereby said adaptive conversion by said pre-regulator, combined with said phase shifted combined output of said base-sub half-bridge series resonant converter unit, provide a highly efficient power conversion by the power supply.

2. The power supply of claim 1, wherein said configuration to perform an adaptive conversion includes a configuration to generate an additional delta voltage based on said pre-regulator input voltage, and to sum said delta voltage and said input voltage to obtain said pre-regulator output voltage.

3. The power supply of claim 1, wherein said pre-regulator includes a driver operative to receive information on said pre-regulator output voltage from a feedback module, said driver used for driving a circuit that performs said adaptive conversion.

4. The power supply of claim 1, wherein said configuration to provide a phase shifted combined output includes a configuration to provide a phase shifted combined output current.

5. The power supply of claim 4, wherein said configuration to provide a phase shifted combined output current includes a configuration to provide a 90 degree shifted combined output current.

6. In a power supply, a method for obtaining a low ripple, low loss output comprising:
    a. providing a boost type pre-regulator having a pre-regulator input voltage and configured to perform an adaptive conversion on said pre-regulator input voltage,
    b. providing a base-sub half-bridge series resonant converter unit that includes a base converter and a sub converter, said unit connected to said boost type pre-regulator through a parallel connection of each of said base and sub converters,
    c. performing said adaptive conversion on said said pre-regulator input voltage, said adaptive conversion outputting a stable and substantially constant pre-regulator output voltage to said base-sub half-bridge series resonant converter unit, and
    d. obtaining a phase shifted combined output from said base-sub half-bridge series resonant converter unit, said phase shifted output characterized by a low ripple, whereby the combined action of said boost type pre-regulator and said base-sub half-bridge series resonant converter unit results in a low power loss, low switching loss, high efficiency power conversion in the power supply.

7. The method of claim 6, wherein said step of performing said adaptive conversion includes the generation of an additional delta voltage based on said pre-regulator input voltage, and the summation of said delta voltage and said input voltage to obtain said pre-regulator output voltage.

8. The method of claim 6, wherein said step of obtaining a phase shifted combined output includes obtaining a phase shifted combined output current.

9. The method of claim 7, wherein said substep of obtaining a phase shifted combined output current further includes obtaining a 90 degree shifted combined output current.

* * * * *